UNITED STATES PATENT OFFICE.

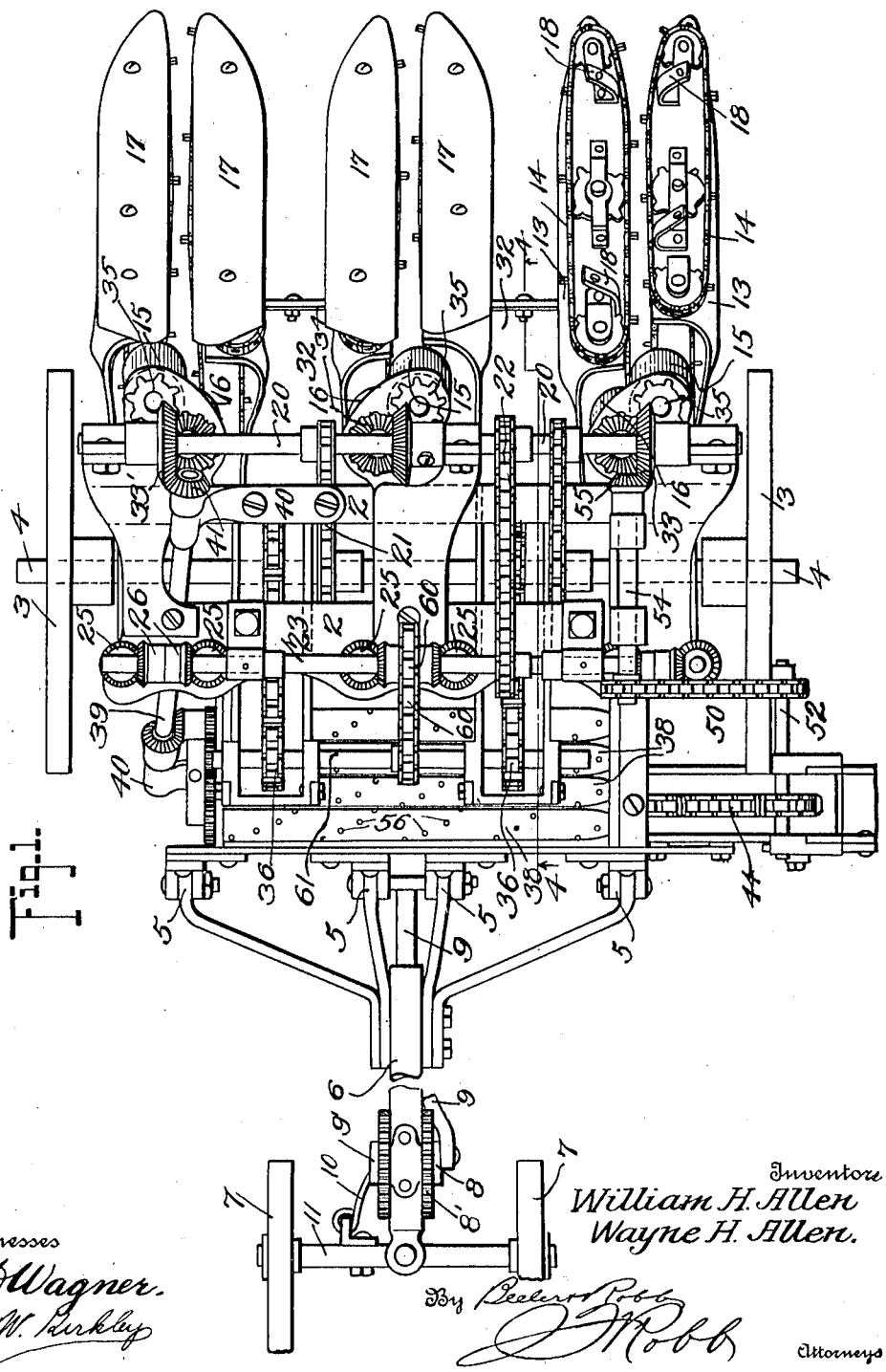

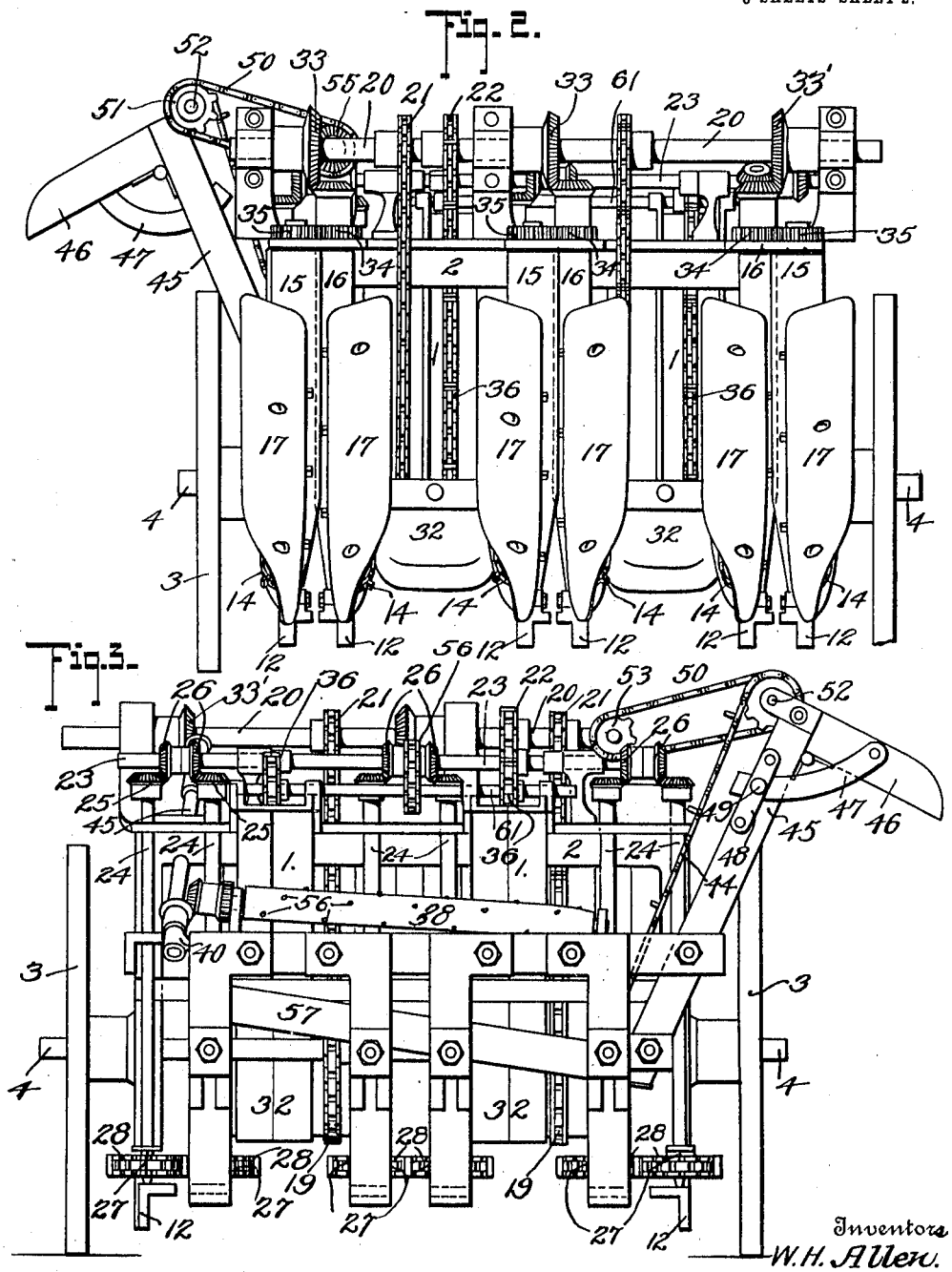

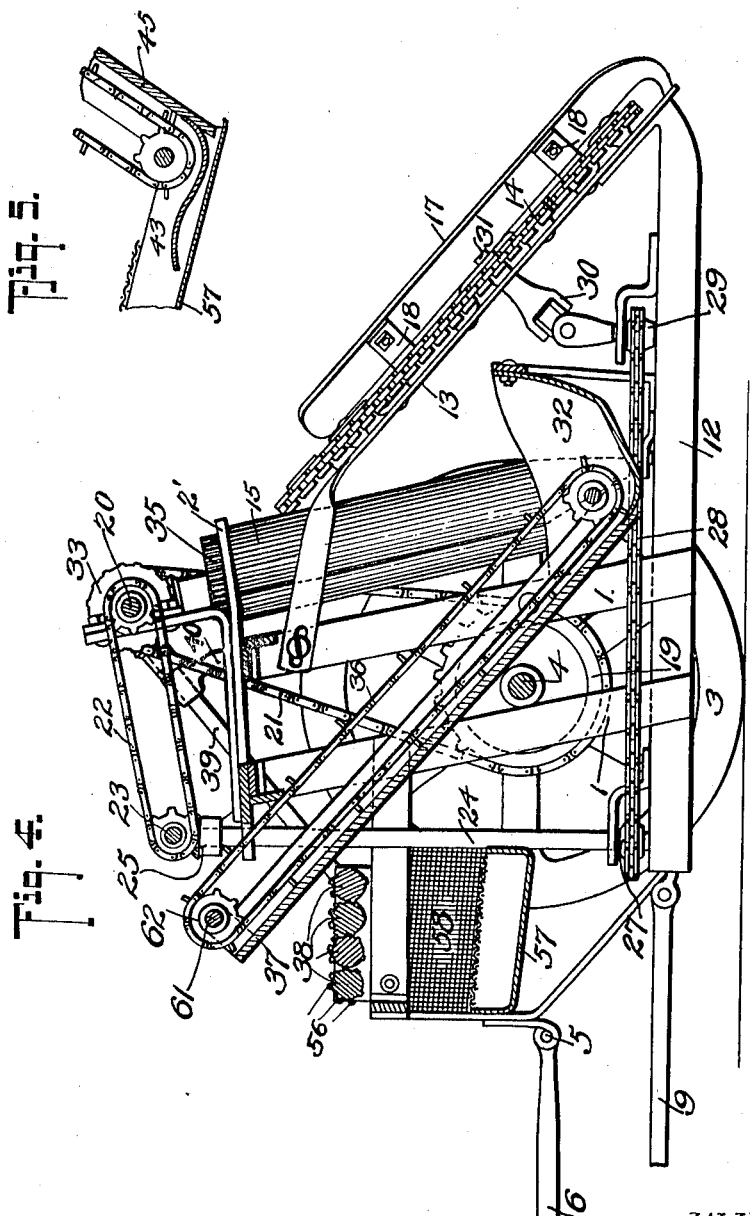

WILLIAM H. ALLEN AND WAYNE H. ALLEN, OF MOMENCE, ILLINOIS.

CORN-HUSKER.

1,035,071. Specification of Letters Patent. Patented Aug. 6, 1912.

Application filed November 24, 1911. Serial No. 662,147.

*To all whom it may concern:*

Be it known that we, WILLIAM H. ALLEN and WAYNE H. ALLEN, citizens of the United States, residing at Momence, in the county of Kankakee and State of Illinois, have invented certain new and useful Improvements in Corn-Huskers, of which the following is a specification.

The present invention involves improvements in that class of agricultural machines ordinarily called corn huskers, the object of the invention being to design a machine of this type capable of husking corn from a number of rows simultaneously as it stands in the field and delivering the ears to a vehicle which may be driven along the side of the machine.

Associated mechanisms are employed to perform the several functions hereinbefore referred to and the invention resides in the special coöperation of said mechanisms and other separate peculiar constructions.

With the above and other objects in view, this invention consists of the construction, combination, and arrangement of parts, all as hereinafter more fully described, claimed and illustrated in the accompanying drawings, wherein, Figure 1 is a top plan view of our husking machine; Fig. 2 is a front elevation thereof; Fig. 3 is a rear elevation; Fig. 4 is a section taken about on the line 4—4 of Fig. 1; and, Fig. 5 is a detail view showing particularly the boot upon which the ears are dropped after being husked by the husking rollers.

Throughout the following detail description and on the several figures of the drawings, similar parts are referred to by like characters of reference.

The husking machine constructed in accordance with this invention comprises a suitable frame composed of a plurality of vertical standards 1 and transverse beams 2, said frame being supported at either side by the wheels 3 mounted on the driving axle 4. Attached to the rear of the frame, as at 5, is pivotally mounted a push pole 6 which in turn is mounted at its rear extremity on the steering wheels 7.

For the purpose of raising and lowering the front portion of the husking machine in the ordinary manner, I provide a lever 8 pivoted to the push pole 6 in proximity to the steering wheels 7, said lever having a link rod 9 extending from its lower end to the frame of the machine beneath the pivotal connection 5 of said pole. By moving the lever 8 forwardly or backwardly, the desired function above mentioned will be accomplished and the lever may be engaged with a notched segment 8' to hold the machine at its adjusted position.

Opposite the lever 8 is pivoted a guiding lever 9', having the link connection 10 extending to the axle 11 on which the wheels 7 are mounted, and by a forward or backward movement of this lever, the machine will be readily turned in the desired direction.

Forming the lower portion of the frame and extending a suitable distance in front of the standards 1 are the spaced longitudinal guiding beams 12, there being two for each row of corn to be operated upon. The spaced boards 13 extending from the forward ends of the beams 12 to the upper portion of the front standards 1 provide a supporting frame for the mechanism such as chains 14, for gathering the stalks and conveying them in upright or vertical position to the snapping rolls 15 and 16, slightly inclined from the vertical and having their lower bearings in the beams 12, and their upper bearings in extensions 2' on the transverse beams 2. The endless chains 14 are mounted between the boards 13 and the upper inclined gathering boards 17 supported by means of the braces 18.

The axle 4 has secured thereto the main driving sprocket wheels 19 which transmit motion to the transverse shaft 20, journaled at the upper front portion of the frame, by means of the driving chains 21, there being two in number, as shown in the drawings. Motion is further communicated from the shaft 20 through the instrumentality of the endless chain 22 to the second transverse shaft 23 journaled in the upper rear portion of the frame, said chain passing around sprocket wheels on the shafts 20 and 23 aforesaid.

Journaled in the upper part of the frame and the guide beams 12 are a plurality of vertical shafts 24 having at their upper extremities beveled gears 25 meshing with other bevel gears 26 on the rear transverse shaft 23. At the lower ends of the shaft 24 are sprocket wheels 27 carrying endless chains 28, by means of which motion is transmitted to sprocket wheels 29 mounted on the forward portion of the guide beams 12, and through the knuckle joints 30 and sprocket wheels 31 the gathering chains 14 are caused to move.

It will be apparent from the foregoing, that the stalks will be carried in an erect position through the spaces between the gathering boards 17 to the snapping rolls, the outer ones, indicated as 15, being of larger diameter than the inner rolls 16, as is customary in this class of machines. The ears are here snapped or pinched off the stalks and fall into the conveyer hoppers 32, the rolls 15 and 16 being rotated by the beveled gears 33 and 33′ on the shaft 20 meshing with beveled gears on the upper extremity of the rolls 16, immediately below which are located pinions 34 intermeshing with other pinions 35 upon the rolls 15. As the ears of corn drop into the hoppers 32, they are carried by the chains 36 up the conveyers 37 where they drop off on the husking rolls 38 in the rear of the frame, any suitable number of which may be provided, though we have preferably shown only two opposing sets. The sets of rolls 38 are revolved toward each other by means of the inclined shaft 39 geared at its lower end to one of said rolls, and having its bearings in the arms 40. At its upper end a miter gear 41 meshes with the rear portion of the miter gear 33′.

As will be most clearly seen by reference to Fig. 3 of the drawings, the husking rolls are arranged transversely of the machine and inclined in order that the corn may be gradually worked toward the lower ends thereof and fall onto the boot 43 where the ears will be conveyed by the chain 44 up the conveyer 45 and pass therefrom down the adjustable spout 46 into a wagon which may be driven alongside the husker. The spout 46 may be adjusted vertically by means of the guide arm 47 passing through the keeper 48 secured to the conveyer 45 and be held in adjusted position by the screw 49.

Motion is communicated to the conveyer chain 44 by means of the chain 50 passing over the sprocket wheel 51 secured to the shaft 52 having its bearings in the upper end of the conveyer 45. The chain also passes over the sprocket wheel 53 at the rear end of the longitudinal shaft 54 which has a beveled gear 55 at its opposite end meshing with the rear portion of the beveled gear 33 on the shaft 20.

The husking rolls 38 are preferably provided on their surfaces with small lugs 56 which are adapted to strip the husk from the ears as they work toward the lower end of the rolls.

Any grains of corn which may be accidentally shelled in the operation above mentioned will drop into a suitable pan or other receptacle 57, beneath the rolls 38, said receptacle having a screen or other reticulated cover 58 to catch the silk and shucks which are in turn blown from the machine by means of a suitable fan located at a convenient place beneath the rolls, said fan not being shown in the drawings.

From the foregoing description in connection with the drawings, the operation and advantages of the invention may be clearly understood by those skilled in the art to which it appertains.

The cycle of operation may be briefly stated as follow:—As the machine advances over the field, the stalks in the several rows are carried by the gathering chains between the spaced gathering boards to the snapping rolls where the ears are detached from said stalks and dropped into conveyer hoppers therebeneath. The stalks are then passed entirely through the machine, being assisted in this operation by the endless chains 28. The ears of corn are then conveyed to the husking rolls and stripped of their husks whereupon by the action of the husking rolls and by virtue of the inclination thereof they fall onto the boot 43 from which they are conveyed to the vehicle being driven beside the machine.

Arranged in rear of the drive shaft 20 is the second drive shaft 23 connected by a drive chain or belt 60 to a counter shaft 61 at the rear upper portion of the machine, said counter shaft carrying driving wheels 62 over which the conveyer chains 36 pass.

Having thus fully described the invention, what we claim as new is:—

1. In a corn husking machine, the combination of a wheeled frame, spaced inclined gathering boards arranged at the front portion of said frame, a plurality of pairs of spaced horizontal guide beams corresponding to and located below said gathering boards, gathering chains mounted for movement on the gathering boards, upwardly extending snapping rolls disposed in spaced relation in rear of the gathering boards and supported upon the frame and said guide beams, jointed shafts arranged between each guide beam and its superposed gathering board, drive wheels at the upper ends of said shafts engaging and driving the gathering chains aforesaid, driving means connected with the lower ends of said shafts, a hopper located at one side of the snapping rolls near their lower ends, a conveyer arranged to elevate the ears of corn from the hopper, husking rolls slightly inclined from the horizontal adapted to receive the ears from the delivery end of the conveyer, means for carrying off the ears after they have been operated upon by the husking rolls, an axle on which the wheels of the machine are mounted, a main driving shaft, connections therebetween and the axle, means for operating the snapping rolls from said driving shaft, means for operating the husking rolls from said driving shaft, a second driving shaft operated from that first named, and means in the lower part of the machine for assisting the movement of the stalks to the rear after they have passed through the snapping rolls, said means being operable from the second driving shaft.

2. In a corn husking machine, the combination of a wheeled frame, spaced inclined gathering boards arranged at the front portion of said frame, a plurality of pairs of spaced horizontal guide beams corresponding to and located below said gathering boards and connected to the latter at their front ends, gathering chains mounted for movement on the gathering boards, upwardly extending snapping rolls disposed in spaced relation in the rear of the gathering boards and supported upon the frame and said guide beams, jointed shafts arranged between each guide beam and its superposed gathering board, drive wheels at the upper ends of said shafts engaging and driving the gathering chains aforesaid, gear wheels connected with the lower ends of said shafts, a hopper located at one side of the snapping rolls near their lower ends, a conveyer arranged to elevate the ears of corn from the hopper, husking rolls slightly inclined from the horizontal adapted to receive the ears from the delivery end of the conveyer, means for carrying off the ears after they have been operated upon by the husking rolls, an axle on which the wheels of the machine are mounted, a main driving shaft, connections therebetween and the axle, gear wheels at the upper ends of the snapping rolls and gear wheels on said driving shaft meshing therewith to drive the rolls, means for operating the husking rolls from said driving shaft, a second driving shaft operated from that first named, means for operating the said conveyer from said second driving shaft, an endless chain mounted on each pair of guide beams to assist the movement of the stalks to the rear after they have passed through said snapping rolls, and means for operating said chains from second driving shaft, said chains engaging said gear wheels first mentioned.

In testimony whereof we affix our signatures in presence of two witnesses.

WILLIAM H. ALLEN.
WAYNE H. ALLEN.

Witnesses:
EDWARD C. CURTIS,
CASS J. HAYDEN.

Copies of this patent may be obtained for five cents each, by addressing the "Commissioner of Patents, Washington, D. C."